(12) United States Patent
Chiang

(10) Patent No.: US 10,827,241 B2
(45) Date of Patent: Nov. 3, 2020

(54) NETWORK AND POWER SHARING DEVICE

(71) Applicant: Agileiots Investment Co., Ltd., Taoyuan (TW)

(72) Inventor: Hung-Hsiang Chiang, Kaohsiung (TW)

(73) Assignee: AGILEIOTS INVESTMENT CO., LTD., Taoyuan (TW)

( * ) Notice: Subject to any disclaimer, the term of this patent is extended or adjusted under 35 U.S.C. 154(b) by 0 days.

(21) Appl. No.: 16/817,568

(22) Filed: Mar. 12, 2020

(65) Prior Publication Data
US 2020/0296488 A1    Sep. 17, 2020

(51) Int. Cl.
| H04B 10/80 | (2013.01) |
| H04Q 11/00 | (2006.01) |
| H02J 50/90 | (2016.01) |
| H02M 3/137 | (2006.01) |

(52) U.S. Cl.
CPC .......... *H04Q 11/0067* (2013.01); *H02J 50/90* (2016.02); *H02M 3/137* (2013.01); *H04B 10/808* (2013.01); *H04Q 11/0005* (2013.01); *H04Q 2011/0049* (2013.01); *H04Q 2209/88* (2013.01); *H04Q 2213/08* (2013.01); *H04Q 2213/1308* (2013.01); *H04Q 2213/401* (2013.01)

(58) Field of Classification Search
CPC ............. H04B 10/808; H04Q 11/0005; H04Q 11/0067; H04Q 2011/0049; H04Q 2209/88; H04Q 2213/08; H04Q 2213/1308; H04Q 2213/401; H04J 14/02; H02J 50/90; H02M 3/137

USPC ..................... 398/25, 43, 140, 164, 165, 177
See application file for complete search history.

(56) References Cited

U.S. PATENT DOCUMENTS

| | | | | |
|---|---|---|---|---|
| 7,729,617 | B2 * | 6/2010 | Sheth ................... | H04B 10/801 398/135 |
| 2004/0213286 | A1 * | 10/2004 | Jette ..................... | H04J 14/0232 370/466 |
| 2005/0089027 | A1 * | 4/2005 | Colton ............... | H04Q 11/0005 370/380 |
| 2009/0015204 | A1 * | 1/2009 | Rosenwald ............. | H02J 9/061 320/134 |
| 2010/0046940 | A1 * | 2/2010 | Cotton .................... | H04M 3/08 398/17 |
| 2012/0288273 | A1 * | 11/2012 | Pohlmann .......... | H04Q 11/0067 398/9 |
| 2015/0012151 | A1 * | 1/2015 | Park .......................... | G06F 1/26 700/298 |
| 2019/0033938 | A1 * | 1/2019 | Ou Yang .................. | G06F 1/26 |
| 2019/0342011 | A1 * | 11/2019 | Goergen ................ | H04B 10/07 |

* cited by examiner

*Primary Examiner* — Li Liu
(74) *Attorney, Agent, or Firm* — Chun-Ming Shih; Lanway IPR Services

(57) ABSTRACT

A network and power sharing device is for being connected to first optical network equipment and second optical network equipment that are built in an optical network, so as to establish power supply architecture for the optical network. The network and power sharing device includes: a power input port and a first power port wherein the first power port is connected to the first optical network equipment; and a power control unit received in the casing, for detecting if the power input port and the first power port output power signals and for controlling a power switch unit to switch power supply transmission paths of the power input port and first power port.

20 Claims, 11 Drawing Sheets

NETWORK AND POWER SHARING DEVICE

CROSS-REFERENCE TO RELATED APPLICATIONS

This application claims the priority of Republic of China Patent Application No. 108108740 filed on Mar. 14, 2019, in the State Intellectual Property Office of the R.O.C., the disclosure of which is incorporated herein by reference.

BACKGROUND OF THE INVENTION

Field of the Invention

The present invention relates to fields of communication facilities, and more particularly, to a network and power sharing device having data transmission and power sharing functions.

Descriptions of the Related Art 5G technology is booming globally, and it is expected that 5G is networked to everything in the future. Telecommunications providers have greatly upgraded current 4G (LTE) technology and widely applied Internet of Things (IoT) to infrastructures, supply chain logistics, asset management, environmental monitoring, etc.

Nowadays using mobile phones is so popular with mature and multiple 4G services being provided. For example, it is very convenient that people can use their mobile phones to check bus arriving timetables for nearby bus stops or look up estimated waiting time for their doctor appointments. The innovation of 5G technology leads to broad application of networking and IoT, such that IoT deployment becomes important. However, IoT deployment is often restricted by relay processing of transmitted data and power supply. Channel capacity of base stations is insufficient and normally cannot fulfill local communication service requirements that are increasing. An effective solution is to build new mobile communication base stations. This however becomes difficult as land available for building the base stations is getting less and residents protest against building the base stations due to health concerns.

Moreover, traditional municipal street lights usually have only one function, that is, road lighting. Current municipal street lights nevertheless are provided with infrastructural facilities such as power supply, grounding for lightning prevention, and pole (whose height is good enough for wireless signal emission), and are relatively evenly distributed. These conditions happen to be right and necessary for building communication base stations. Therefore, how to effectively utilize currently available urban infrastructures to solve the above difficulties encountered by building base stations, is an important task in the art.

SUMMARY OF THE INVENTION

In view of the above drawbacks in the prior art, a primary object of the present invention is to provide a network and power sharing device, which overcomes problems encountered by building base stations (difficult to find available land), relay processing of transmitted data and power supply, so as to facilitate IoT deployment and improve application of networking and IoT.

According to another purpose of the invention is to provide a network and power sharing device, so as to facilitate IoT deployment and improve application of networking and IoT.

To achieve the above and other objects, the present invention provides a network and power sharing device for being connected to first optical network equipment and second optical network equipment that are built in an optical network, so as to establish power supply architecture for the optical network and allow network communication operations between the first optical network equipment and the second optical network equipment operate normally, the network and power sharing device including: a casing formed with a first optical transceiver port, a second optical transceiver port, a power input port, a first power port and a second power port thereon, wherein the power input port is for receiving input of power signals and outputting the power signals, the first optical transceiver port is connected to the first optical network equipment and for receiving and transmitting optical signals, the second optical transceiver port is connected to the second optical network equipment and for receiving and transmitting optical signals, the first power port is connected to the first optical network equipment, and the second power port is connected to the second optical network equipment; a first optical-electrical conversion unit received in the casing, for converting the optical signals received by the first optical transceiver port into electric signals that are to be outputted, or converting electric signals into optical signals that are outputted to the first optical transceiver port; a second optical-electrical conversion unit received in the casing, for converting the optical signals received by the second optical transceiver port into electric signals that are to be outputted, or converting electric signals into optical signals that are outputted to the second optical transceiver port; a network with power transforming unit received in the casing, and connected to the first optical-electrical conversion unit and the second optical-electrical conversion unit to provide a signal and power transmission bridge between the first optical-electrical conversion unit and the second optical-electrical conversion unit; and a DC-to-DC converter received in the casing, for converting the power signals outputted by the power input port into a DC power supply that is outputted to the first power port, the second power port and the network with power transforming unit, so as to allow the first optical network equipment, the second optical network equipment and the network with power transforming unit to obtain power to operate.

Preferably, in the network and power sharing device said above, wherein there is a boost converter mounted between the DC-to-DC converter and the second power port.

Preferably, in the network and power sharing device said above, the power signals received by the power input port are DC signals, and there is a boost converter mounted between the power input port and the DC-to-DC converter.

In addition, the present invention further provides a network and power sharing device for being connected to first optical network equipment and second optical network equipment that are built in an optical network, so as to establish power supply architecture for the optical network and allow network communication operations between the first optical network equipment and the second optical network equipment operate normally, the network and power sharing device including: a casing formed with a first optical transceiver port, a second optical transceiver port, a first power port and a second power port thereon, wherein the first power port is connected to the first optical network equipment and for receiving power signals inputted by the first optical network equipment and outputting the power signals, the second power port is connected to the second optical network equipment, the first optical transceiver port is connected to the first optical network equipment and for receiving and transmitting optical signals, and the second optical transceiver port is connected to the second optical network equipment and for receiving and transmitting optical signals; a first optical-electrical conversion unit received in the casing, for converting the optical signals received by the first optical transceiver port into electric signals that are to be outputted, or converting electric signals into optical signals that are outputted to the first optical transceiver port; a second optical-electrical conversion unit received in the casing, for converting the optical signals received by the second optical transceiver port into electric signals that are to be outputted, or converting electric signals into optical signals that are outputted to the second optical transceiver port; a network with power transforming unit received in the casing, and connected to the first optical-electrical conversion unit and the second optical-electrical conversion unit to provide a signal and power transmission bridge between the first optical-electrical conversion unit and the second optical-electrical conversion unit; and a DC-to-DC converter received in the casing, for converting the power signals outputted by the first power port into a DC power supply that is outputted to the second power port and the network with power transforming unit, so as to allow the second optical network equipment and the network with power transforming unit to obtain power to operate.

Preferably, in the network and power sharing device said above, wherein there is a buck converter mounted between the DC-to-DC converter and the first power port, and there is a boost converter mounted between the DC-to-DC converter and the second power port.

Furthermore, the present invention further provides a network and power sharing device for being connected to first optical network equipment and second optical network equipment that are built in an optical network, so as to establish power supply architecture for the optical network and allow network communication operations between the first optical network equipment and the second optical network equipment operate normally, the network and power sharing device including: a casing formed with a first optical transceiver port, a second optical transceiver port, a power input port, a first power port and a second power port thereon, wherein the power input port is for receiving input of power signals, the first optical transceiver port is connected to the first optical network equipment and for receiving and transmitting optical signals, the second optical transceiver port is connected to the second optical network equipment and for receiving and transmitting optical signals, the first power port is connected to the first optical network equipment, and the second power port is connected to the second optical network equipment; a power switch unit received in the casing, and connected to the power input port and the first power port, for switching power supply transmission paths of the power input port and first power port; an equipment power switch received in the casing and connected to the power switch unit; a power control unit received in the casing, for detecting if the power input port and the first power port output power signals and for controlling the power switch unit to switch the power supply transmission paths of the power input port and first power port, wherein when the power control unit detects the power input port outputting the power signals, it controls the power switch unit to output the power signals as a power supply and turns on the equipment power switch, and wherein when the power control unit detects the power input port not outputting the power signals while detects the first power port receiving equipment power outputted by the first optical network equipment, it controls the power switch unit to output the equipment power as the power supply and turns off the equipment power switch; a first optical-electrical conversion unit received in the casing, for converting the optical signals received by the first optical transceiver port into electric signals that are to be outputted, or converting electric signals into optical signals that are outputted to the first optical transceiver port; a second optical-electrical conversion unit received in the casing, for converting the optical signals received by the second optical transceiver port into electric signals that are to be outputted, or converting electric signals into optical signals that are outputted to the second optical transceiver port; a network with power transforming unit received in the casing, and connected to the first optical-electrical conversion unit and the second optical-electrical conversion unit to provide a signal and power transmission bridge between the first optical-electrical conversion unit and the second optical-electrical conversion unit; and a DC-to-DC converter received in the casing, for converting the power supply outputted by the power switch unit into a DC power supply that is outputted to the turned-on equipment power switch, the second power port and the network with power transforming unit.

Preferably, in the network and power sharing device said above, further including: a functional module received in the casing and connected to the network with power transforming unit, for proving a service function.

Preferably, in the network and power sharing device said above, further including: an optical switch unit received in the casing, and having a first optical switch and a second optical switch, wherein the first optical switch is connected to the first optical transceiver port and the first optical-electrical conversion unit respectively, and the second optical switch is connected to the second optical transceiver port and the second optical-electrical conversion unit respectively; and an optical switching control unit for monitoring an operating status of the network with power transforming unit, wherein when the optical switching control unit finds the network with power transforming unit operating normally, it sends a first control command to the optical switch unit so as to allow the first optical transceiver port to be connected to the first optical-electrical conversion unit and allow the second optical transceiver port to be connected to the second optical-electrical conversion unit, and wherein when the optical switching control unit finds the network with power transforming unit not operating normally, it sends a second control command to the optical switch unit so as to allow the first optical transceiver port to be connected to the second optical transceiver port and implement optical signal transmission between the first optical transceiver port and the second optical transceiver port.

Preferably, in the network and power sharing device said above, further including: a functional module received in the casing and connected to the network with power transforming unit, for proving a service function.

Preferably, in the network and power sharing device said above, further including: a signal transmission port mounted on the casing and connected to the network with power transforming unit, wherein the signal transmission port is further connected to an external functional unit, for allowing the external functional unit to obtain power and perform signal transmission through the network with power transforming unit.

Preferably, in the network and power sharing device said above, wherein the signal transmission port further includes a network signal conversion module for performing network signal conversion on signals transmitted by the functional module, so as to implement network transmission through the network with power transforming unit.

Preferably, in the network and power sharing device said above, wherein the casing is further formed with a third optical transceiver port, a third power port and at least one leased line optical transceiver port thereon, wherein the third optical transceiver port is connected to a first leased line network and the leased line optical transceiver port, the leased line optical transceiver port is for being connected to first leased line equipment, and the third power port is connected to the DC-to-DC converter and for transmitting the DC power supply, which is outputted after converted by the DC-to-DC converter, to the first leased line equipment.

Preferably, in the network and power sharing device said above, wherein the casing is further formed with a fourth optical transceiver port thereon, and the network and power sharing device further includes a leased line network switch and a transceiver port control unit, wherein the fourth optical transceiver port is connected to a second leased line network and the leased line network switch, and the transceiver port control unit is for monitoring optical power of the third optical transceiver port, wherein when the transceiver port control unit finds the optical power too low, it sends a switching command to the leased line network switch to connect the fourth optical transceiver port to the leased line optical transceiver port, so as to allow the second leased line network, which is connected to the fourth optical transceiver port, to perform transmission operations when transmission through the first leased line network connected to the third optical transceiver port is abnormal.

Preferably, in the network and power sharing device said above, wherein the network and power sharing device further includes a wavelength division multiplexer received in the casing, wherein the wavelength division multiplexer is connected to the third optical transceiver port, the leased line optical transceiver port and the first leased line network, and for retrieving optical signals of a particular wavelength from third optical transceiver port and transmitting them to the leased line optical transceiver port, or combining optical signals outputted by the leased line optical transceiver port and optical signals transmitted by the first leased line network to allow the combined optical signals to be transmitted by the first leased line network.

Preferably, in the network and power sharing device said above, further including: a patch panel for adjusting connections between the optical transceiver ports and the optical switches.

Preferably, in the network and power sharing device said above, wherein the power signals received by the power input port are AC signals, and the network and power sharing device further includes: a surge protector received in the casing, and connected to the power switch unit to receive the AC signals, so as to remove an instantaneous current occurring when the AC signals are inputted and output first AC power signals; and a rectifier received in the casing and connected to the surge protector to receive the first AC power signals, so as to rectify the first AC power signals to DC power signals and output the DC power signals to the DC-to-DC converter where the DC-to-DC converter modulates the DC power signals into the DC power supply that is outputted to the turned-on equipment power switch, the second power port and the network with power transforming unit.

Preferably, in the network and power sharing device said above, further including: a first function expansion unit for being coupled to a first peripheral device, wherein the surge protector further outputs second AC power signals to the first function expansion unit, making the coupled first peripheral device obtain power to work.

Preferably, in the network and power sharing device said above, wherein the first peripheral device is street lighting equipment, and the first function expansion unit includes: a street light connector mounted on the casing and for being connected to the street lighting equipment, so as to transmit the second AC power signals outputted by the surge protector to the street lighting equipment; a street light dimmer connected to the street light connector, for controlling lightness of the street lighting equipment; and a street light driver connected to the surge protector, for receiving the second AC power signals to provide power for the street lighting equipment, such that the street lighting equipment obtains power to operate.

Preferably, in the network and power sharing device said above, wherein the power signals received by the first power port from the first optical network equipment are AC signals, and the network and power sharing device further includes: a surge protector received in the casing, and connected to the power switch unit to receive the AC signals, so as to remove an instantaneous current occurring when the AC signals are inputted and output first AC power signals; and a rectifier received in the casing and connected to the surge protector to receive the first AC power signals, so as to rectify the first AC power signals to DC power signals and output the DC power signals to the DC-to-DC converter where the DC-to-DC converter modulates the DC power signals into the DC power supply that is outputted to the second power port and the network with power transforming unit.

Preferably, in the network and power sharing device said above, wherein there is a buck converter mounted between the DC-to-DC converter and the power switch unit, and there is a boost converter mounted respectively between the DC-to-DC converter and the equipment power switch and between the DC-to-DC converter and the second power port.

Preferably, in the network and power sharing device said above, further including: a first function expansion unit for being coupled to a first peripheral device, wherein the first function expansion unit is connected to the DC-to-DC converter to transmit the DC power supply outputted by the DC-to-DC converter to the first function expansion unit, making the coupled first peripheral device obtain power to work.

In summary, the network and power sharing device according to the present invention can be mounted on street lights and obtain power from the street lights, and is built in with a network with power transforming unit, a plurality of optical transceiver ports or signal transmission ports and a leased line optical transceiver port. It thus achieves network sharing and power sharing for network equipment. Further, the network and power sharing device is built in with a functional module such as artificial intelligent computing processor, which can proceed with computation first and then data transmission, thereby reducing transmission loads and reinforcing efficacy of network data transmission as well as facilitating quick installation of outdoor IoT gateways by telecommunications providers.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
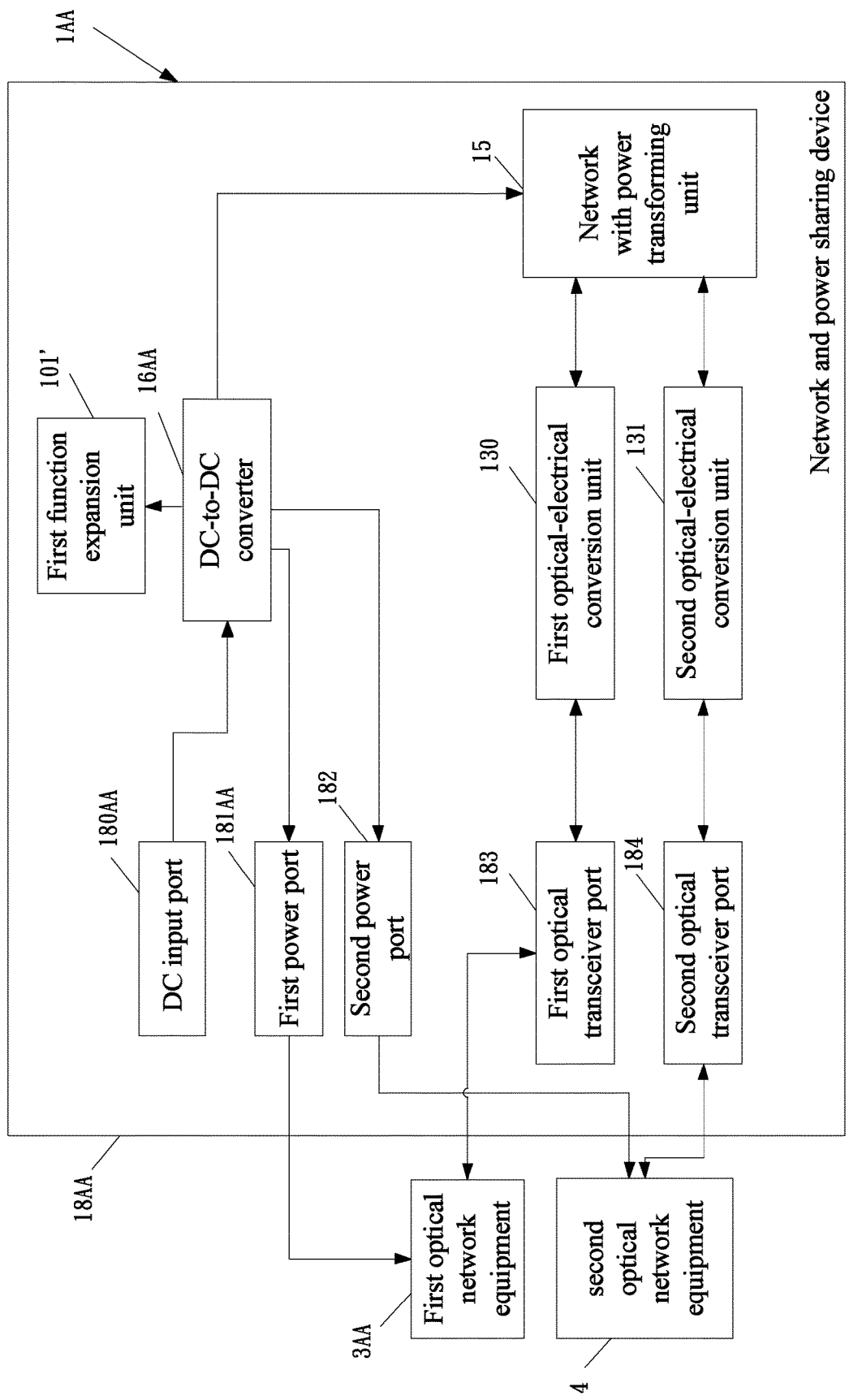
FIG. 1 is a block schematic diagram of basic system architecture of a network and power sharing device according to first embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

As shown in FIG. 1, a network and power sharing device 1AA according to a preferred embodiment of the present invention is used to provide functions of power supply and network transmission for first optical network equipment 3AA and second optical network equipment 4, so as to build power supply architecture of optical networks and allow network communication operations between the first optical network equipment 3AA and the second optical network equipment 4 operate normally. The network and power sharing device 1AA includes: a casing 18AA, a first optical-electrical conversion unit 130, a second optical-electrical conversion unit 131, a network with power transforming unit 15 and a DC-to-DC converter 16AA. The first optical-electrical conversion unit 130, the second optical-electrical conversion unit 131, the network with power transforming unit 15 and the DC-to-DC converter 16AA are all received in the casing 18AA. The casing 18AA is formed with a plurality of connection ports thereon. In this embodiment, the plurality of connection ports include: a DC input port 180AA, a first power port 181AA, a second power port 182, a first optical transceiver port 183 and a second optical transceiver port 184. The DC input port 180AA is used to receive input of DC power, wherein DC power can come from a DC power supplier, a DC power controller or an external battery (not shown). The network with power transforming unit 15 is, for example, POE (Power Over Ethernet) or POH (Power over HDBaseT). It should be noted that, a power input port used for receiving power for the network and power sharing device 1AA is not limited to the DC input port 180AA in this embodiment, but can also be an AC input port (as described in later embodiments shown in FIGS. 8 and 9). Such flexibility is allowed for different implementations of embodiments.

Further as shown in FIG. 1, the first optical transceiver port 183 and the second optical transceiver port 184 are respectively connected to the first optical network equipment 3AA and the second optical network equipment 4, for receiving optical signals. In addition, the first power port 181AA and the second power ports 182 are respectively connected to the first optical network equipment 3AA and the second optical network equipment 4.

The first optical-electrical conversion unit 130 is used to convert optical signals, which are received by the first optical transceiver port 183, into electric signals that are then outputted, or to convert electric signals into optical signals that are then outputted to the first optical transceiver port 183. The second optical-electrical conversion unit 131 is used to convert optical signals, which are received by the second optical transceiver port 184, into electric signals that are then outputted, or to convert electric signals into optical signals that are then outputted to the second optical transceiver port 184. The network with power transforming unit 15 is connected to the first optical-electrical conversion unit 130 and the second optical-electrical conversion unit 131 respectively, and acts as a signal and power transmission bridge between the first optical-electrical conversion unit 130 and the second optical-electrical conversion unit 131. The DC-to-DC converter 16AA is used to modulate power signals outputted from the DC input port 180AA into a DC power supply that is outputted to the first power port 181AA, the second power port 182 and the network with power transforming unit 15, such that the first optical network equipment 3AA, the second optical network equipment 4 and the network with power transforming unit 15 can obtain power to operate. It should be noted that, the network and power sharing device 1AA of FIG. 1 can further include a data processing unit between the first optical-electrical conversion unit 130 and the second optical-electrical conversion unit 131 and the network with power transforming unit 15, wherein the data processing unit supports DDS (Data Distribution Service) standards, and is used to process data in the electric signals outputted after conversion from the first optical-electrical conversion unit 130 and the second optical-electrical conversion unit 131, in order to allow the processed data to comply with DDS standards that are based on publish and subscribe communication rules and combined with distribution system architecture.

If DC signals received by the DC input port 180AA are from a distal end or are stronger high power signals, there can be provided a buck converter between the DC-to-DC converter 16AA and the DC input port 180AA, and a boost converter between the DC-to-DC converter 16AA and the first power port 181AA. The network and power sharing device 1AA in this embodiment supplies power to the first optical network equipment 3AA in a distal point to point way. In order to prevent power signals from decaying due to distal transmission, the power signals to be outputted are converted into stronger high power signals by the boost converter. When the DC signals received by the DC input port 180AA are high power signals obtained through distal transmission, the buck converter converts the high power signals into operational power signals suitable for the network and power sharing device 1AA.

The network and power sharing device 1AA shown in FIG. 1 further includes: a first function expansion unit 101' for being coupled to a peripheral device. The first function expansion unit 101' is also connected to the DC-to-DC converter 16AA, and the DC-to-DC converter 16AA outputs the DC power supply to the first function expansion unit 101', such that the coupled peripheral device obtains power to work. The peripheral device can be DC street lighting equipment or DC road traffic directing equipment (such as traffic light), etc. If the first function expansion unit 101' is coupled to the DC street lighting equipment, it includes: a DC street light connector and a street light dimmer, wherein the DC street light connector is mounted on the casing 18AA and is connected to the DC street lighting equipment, and the street light dimmer is connected to the DC street light connector to control lightness of the DC street lighting equipment.

Figure 2:
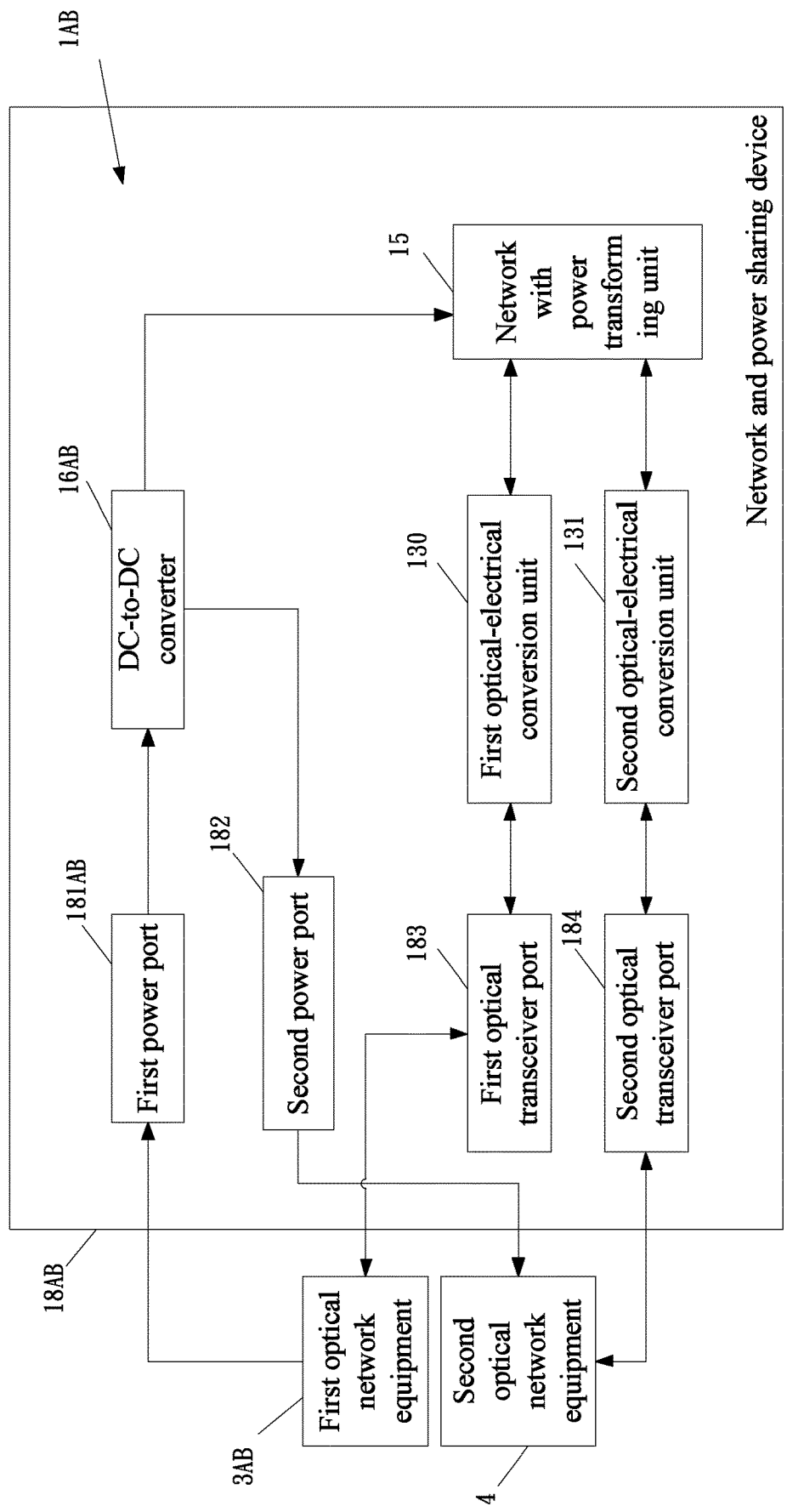
FIG. 2 is a block schematic diagram of basic system architecture of a network and power sharing device according to second embodiment of the present invention.

As shown in FIG. 2, to simplify description, a network and power sharing device 1AB in this embodiment is merely mentioned here for its differences from the network and power sharing device 1AA of FIG. 1. The differences include that, the network and power sharing device 1AB in this embodiment does not have the DC input port 180AA shown in FIG. 1, and its power is from power signals received by a first power port 181AB from first optical network equipment 3AB, and a DC-to-DC converter 16AB modulates and converts the power signals outputted from the first power port 181AB into a DC power supply that is outputted to the second power port 182 and the network with power transforming unit 15, such that the second optical network equipment 4 obtains power from the first optical network equipment 3AB.

It should be noted that, in the network and power sharing device 1AB shown in FIG. 2, there can be provided a buck converter between the DC-to-DC converter 16AB and the first power port 181AB, and a boost converter between the DC-to-DC converter 16AB and the second power port 182. The first optical network equipment 3AB supplies power to the network and power sharing device 1AB in a distal point to point way. In order to prevent power signals from decaying due to distal transmission, stronger high power signals are outputted from a transmitting end through the boost converter, and when the stronger high power signals are received by a receiving end, the buck converter then converts them into operational power signals suitable for receiving-end equipment.

Figure 3:
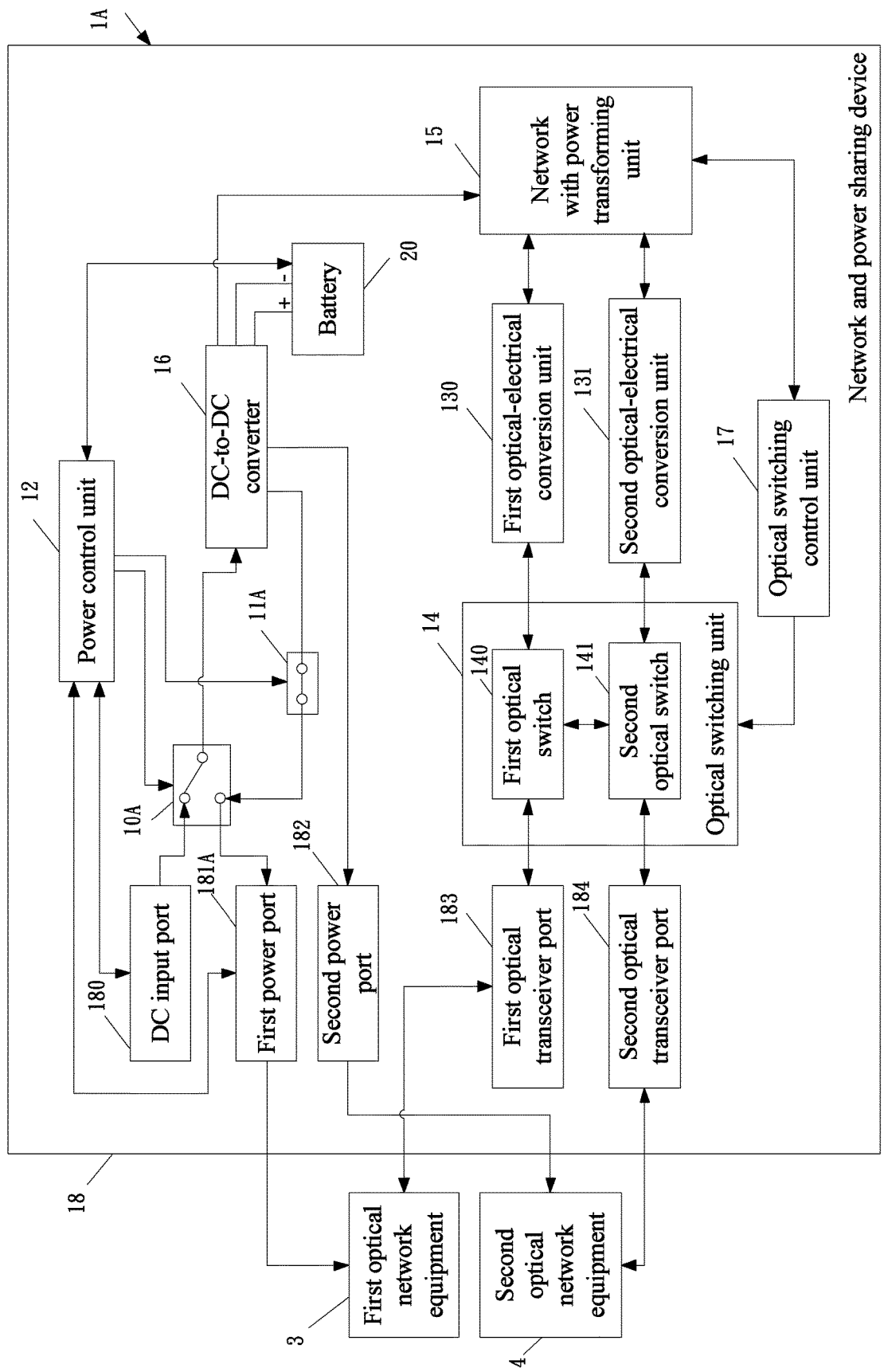
FIG. 3 is a block schematic diagram of basic system architecture of a network and power sharing device according to third embodiment of the present invention.
Figure 4:
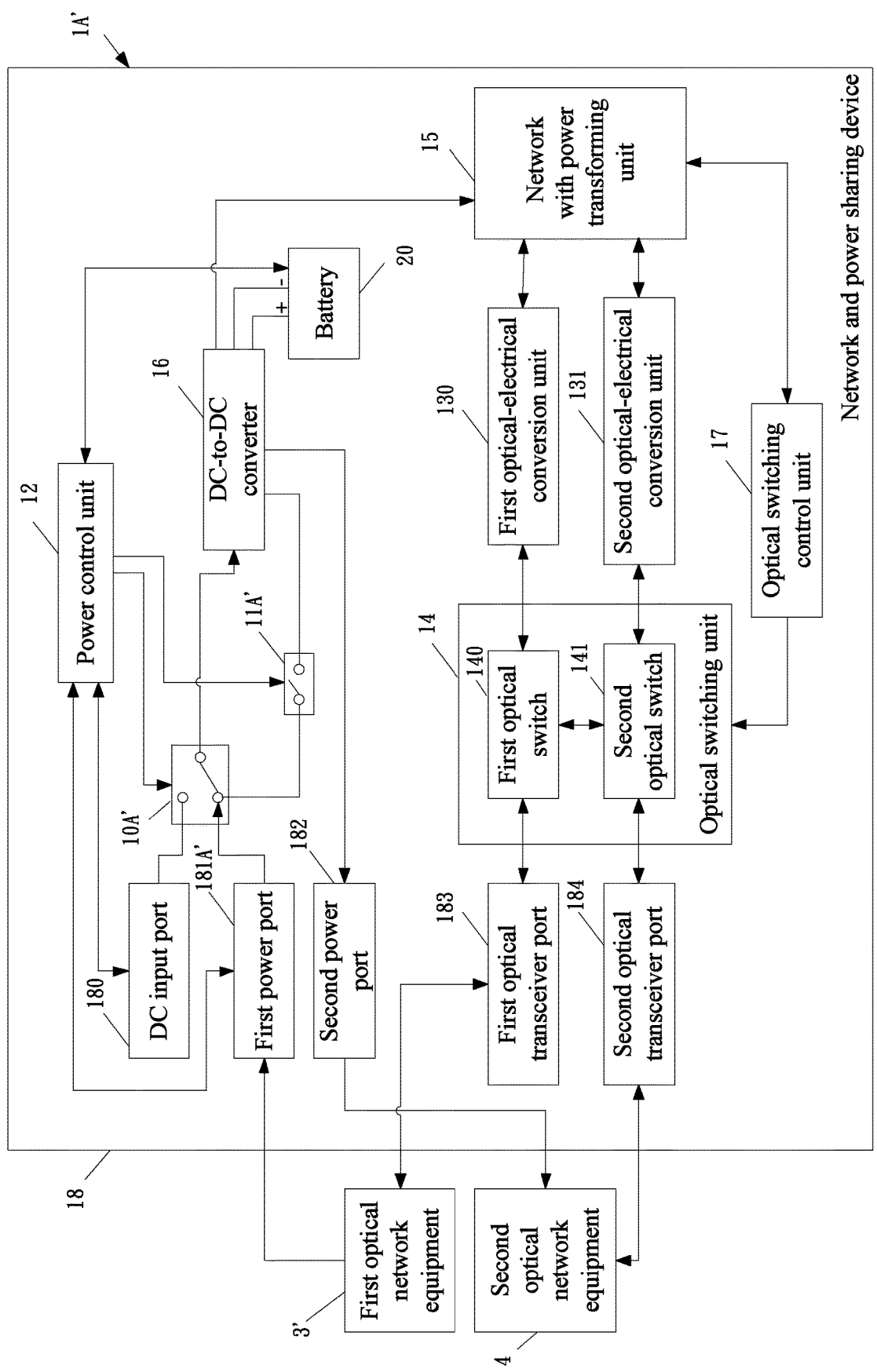
FIG. 4 is a block schematic diagram of basic system architecture of a network and power sharing device according to fourth embodiment of the present invention.

As shown in FIG. 3, to simplify description, a network and power sharing device 1A in this embodiment is merely mentioned here for its differences from the network and power sharing device 1AA of FIG. 1. The network and power sharing device 1A in this embodiment further includes: a power switch unit 10A, an equipment power switch 11A, a power control unit 12, an optical switch unit 14 and an optical switching control unit 17, wherein the power switch unit 10A, the equipment power switch 11A, the power control unit 12, the optical switch unit 14 and the optical switching control unit 17 are all received in the casing 18. It should be noted that, compared to FIGS. 1 and 2, the network and power sharing device 1A in this embodiment can automatically adjust receiving paths for power signals from different power supply sources due to provision of the power switch unit 10A, the equipment power switch 11A and the power control unit 12. The power switch unit 10A is connected to a DC input port 180 and a first power port 181A, and for switching power supply transmission paths of the DC input port 180 and first power port 181A. Referring to FIG. 4, to simplify description, a network and power sharing device 1A' in this embodiment is merely mentioned here for its differences from the network and power sharing device 1A of FIG. 3. The differences are that, the embodiment of FIG. 3 uses power signals outputted from the DC input port 180 as a power supply, which is similar to FIG. 1; while the embodiment of FIG. 4 uses equipment power outputted from a first power port 181A' as a power supply, which is similar to FIG. 2. Switching of the above power supply transmission paths is done by the power control unit 12 that detects if the DC input port 180 and the first power port 181A (or 181A') output a power supply, to control the power switch unit 10A (or 10A') to switch the power supply transmission paths of the DC input port 180 and first power port 181A (or 181A'). When the power control unit 12 detects the DC input port 180 outputting power signals, it controls the power switch unit 10A to output the power signals as a power supply, and turns on the equipment power switch 11A (as shown in FIG. 1). When the power control unit 12 detects the DC input port 180 not outputting power signals but detects the first power port 181A' receiving equipment power from first optical network equipment 3', it controls the power switch unit 10A' to output the equipment power as a power supply, and turns off the equipment power switch 11A' (as shown in FIG. 4).

Compared to FIGS. 1 and 2, the embodiments of FIGS. 3 and 4 not only can automatically adjust a power supply according to practical input of power signals, but also can further detect if the network with power transforming unit 15 operates normally by the optical switch unit 14 and the optical switching control unit 17. The optical switch unit 14 has a first optical switch 140 and a second optical switch 141, wherein the first optical switch 140 is connected to the first optical transceiver port 183 and the first optical-electrical conversion unit 130 respectively, and the second optical switch 141 is connected to the second optical transceiver port 184 and the second optical-electrical conversion unit 131 respectively.

A DC-to-DC converter 16 is used to modulate a power supply outputted from the power switch unit 10A. In the case of FIG. 1, as the power control unit 12 detects the DC input port 180 outputting power signals, it turns on the equipment power switch 11A and controls the power switch unit 10A to switch to outputting the power signals as a power supply. Then, the DC-to-DC converter 16 modulates the power supply into DC power that is outputted to the turned-on equipment power switch 11A, the second power port 182 and the network with power transforming unit 15 respectively, making the first optical network equipment 3 and the second optical network equipment 4 obtain power. In another case of FIG. 2, as the power control unit 12 detects the DC input port 180 not outputting power signals but detects the first power port 181A' outputting equipment power transmitted from the first optical network equipment 3', it turns off the equipment power switch 11A' and controls the power switch unit 10A' to switch to outputting the equipment power as a power supply. Then, the DC-to-DC converter 16 modulates the equipment power outputted from the power switch unit 10A' into DC power that is outputted to the second power port 182 and the network with power transforming unit 15, such that the second optical network equipment 4 obtains power from the first optical network equipment 3'.

The optical switching control unit 17 is used to monitor an operating status of the network with power transforming unit 15. When it finds the network with power transforming unit 15 operating normally, it sends a first control command to the optical switch unit 14 so as to allow the first optical transceiver port 183 to be connected to the corresponding first optical-electrical conversion unit 130 and allow the second optical transceiver port 184 to be connected to the corresponding second optical-electrical conversion unit 131. When the optical switching control unit 17 finds the network with power transforming unit 15 not operating normally, it sends a second control command to the optical switch unit 14 so as to allow the first optical transceiver port 183 to be connected to the second optical transceiver port 184. This achieves an optical signal transmission operation between the first optical transceiver port 183 and the second optical transceiver port 184, and thus assures normal network communication of the first optical network equipment 3 and the second optical network equipment 4 even if optical networks are disconnected when the network with power transforming unit 15 loses power or crashes.

According to specification requirements, there can be mounted a DC leakage circuit breaker on any of DC transmission paths between the DC input port 180, the first power port 181A (or 181A'), the second power port 182 and the DC-to-DC converter 16, to provide overload protection or short circuit protection.

Similar to the above FIGS. 1 and 2, in order to prevent power signals from decaying due to distal point to point transmission, in the network and power sharing device 1A of FIG. 3, there can be provided a buck converter between the DC-to-DC converter 16 and the power switch unit 10A, and a boost converter between the DC-to-DC converter 16 and the second power port 182. And in the network and power sharing device 1A' of FIG. 4, there can be provided a buck converter between the DC-to-DC converter 16 and the power switch unit 10A', and a boost converter between the DC-to-DC converter 16 and the second power port 182.

Moreover, in the embodiment shown in FIG. 3, in the casing 18 there can further include at least one battery 20 for storing the power supply modulated and outputted by the DC-to-DC converter 16. The stored power in the battery 20 serves as a source of power when the power control unit 12 detects neither the DC input port 180 nor the first power port 181A' outputting power.

Figure 5:
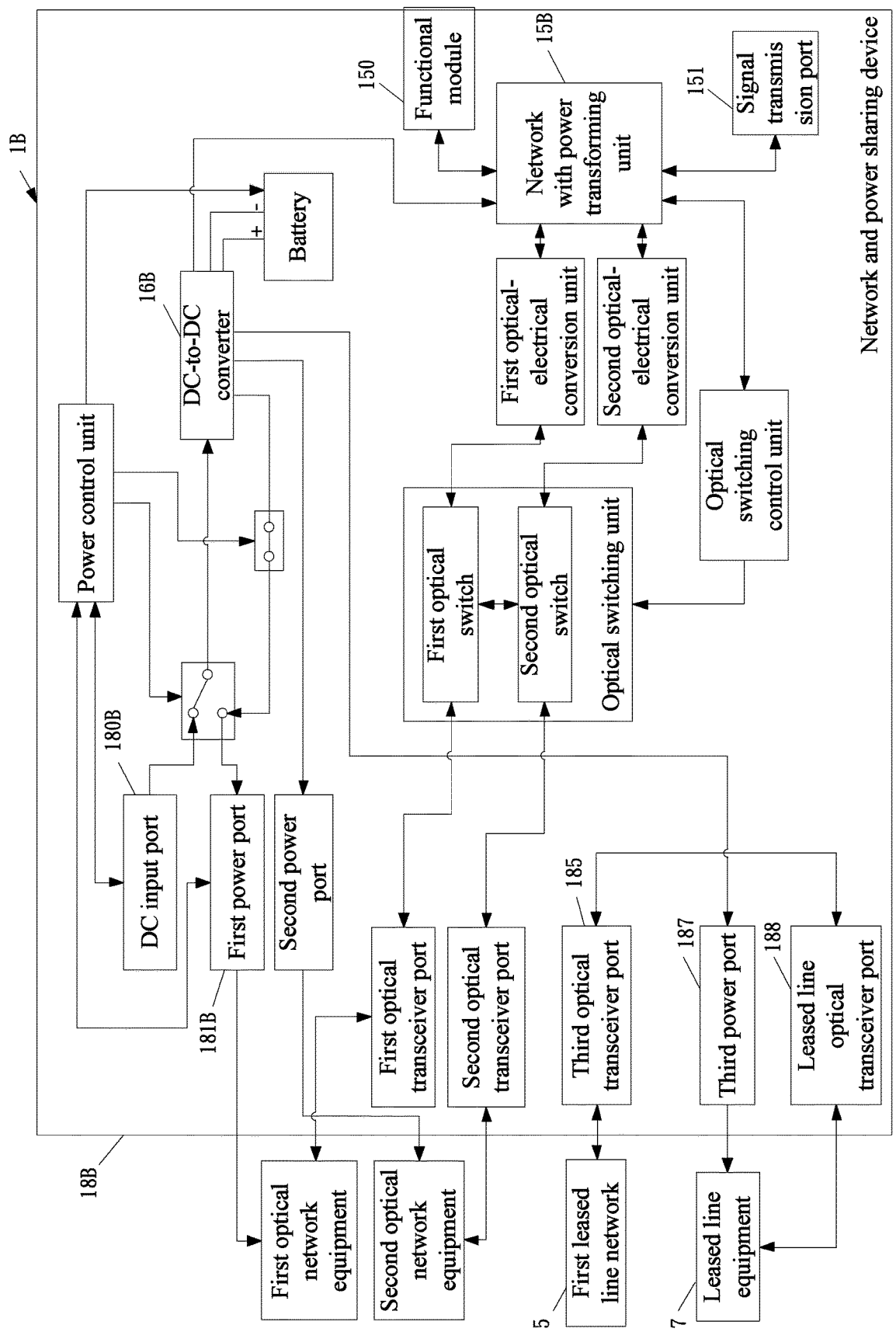
FIG. 5 is a block schematic diagram of basic system architecture of a network and power sharing device according to fifth embodiment of the present invention.

As shown in FIG. 5, to simplify description, a network and power sharing device 1B in this embodiment is merely mentioned here for its differences from the network and power sharing device 1A of FIG. 3. The network and power sharing device 1B in this embodiment further includes in its casing 18B: a third optical transceiver port 185, a third power port 187 and a leased line optical transceiver port 188. The third optical transceiver port 185 is connected to a first leased line network 5, and is connected to the leased line optical transceiver port 188 via a leased line network switch 190. The leased line optical transceiver port 188 is used for being connected to leased line equipment 7 such as network access device or mobile base station. The third power port 187 is connected to a DC-to-DC converter 16B, for outputting power signals, which are modulated by the DC-to-DC converter 16B, to the leased line equipment 7 as a power supply.

Moreover, the network and power sharing device 1B in this embodiment further includes: a functional module 150, and a signal transmission port 151 formed on the casing 18B. The functional module 150 and the signal transmission port 151 are both connected to a network with power transforming unit 15B. The functional module 150 is used to provide a service function such as artificial intelligent computing process service. The signal transmission port 151 can be connected to an external functional unit. In a practical embodiment, the signal transmission port is for example an image signal receiving port, and the external functional unit is for example a network camera device. With cooperation of the signal transmission port 151 and the functional module 150, an image recognition computing process can be implemented, and computing results can be transmitted by the network with power transforming unit 15B. Thus, the network and power sharing device 1B in this embodiment applies the artificial intelligent computing process provided by the functional module 150 so as to reduce computing loads of back end equipment. Alternatively, the network and power sharing device 1B can output decision results under a particular circumstance. For example, if the network and power sharing device 1B in this embodiment provides a monitoring function, the artificial intelligent computing process from the functional module 150 allows image recognition to be performed on image signals received by the signal transmission port 151. If there is decided an image entering into a monitoring area during image recognition, the functional module 150 may issue a warning message via the network with power transforming unit 15B. Thus, the network and power sharing device 1B according to the present invention not only shares data transmission communication and power, but also provides an edge computing process such as artificial intelligent computing process.

It should be noted that, the signal transmission port 151 is not limited to the above image signal receiving port, but can be any connection port for signal transmission. And, the signal transmission port 151 further includes a network signal conversion module for performing network signal conversion on signals transmitted from the external functional unit.

Figure 6:
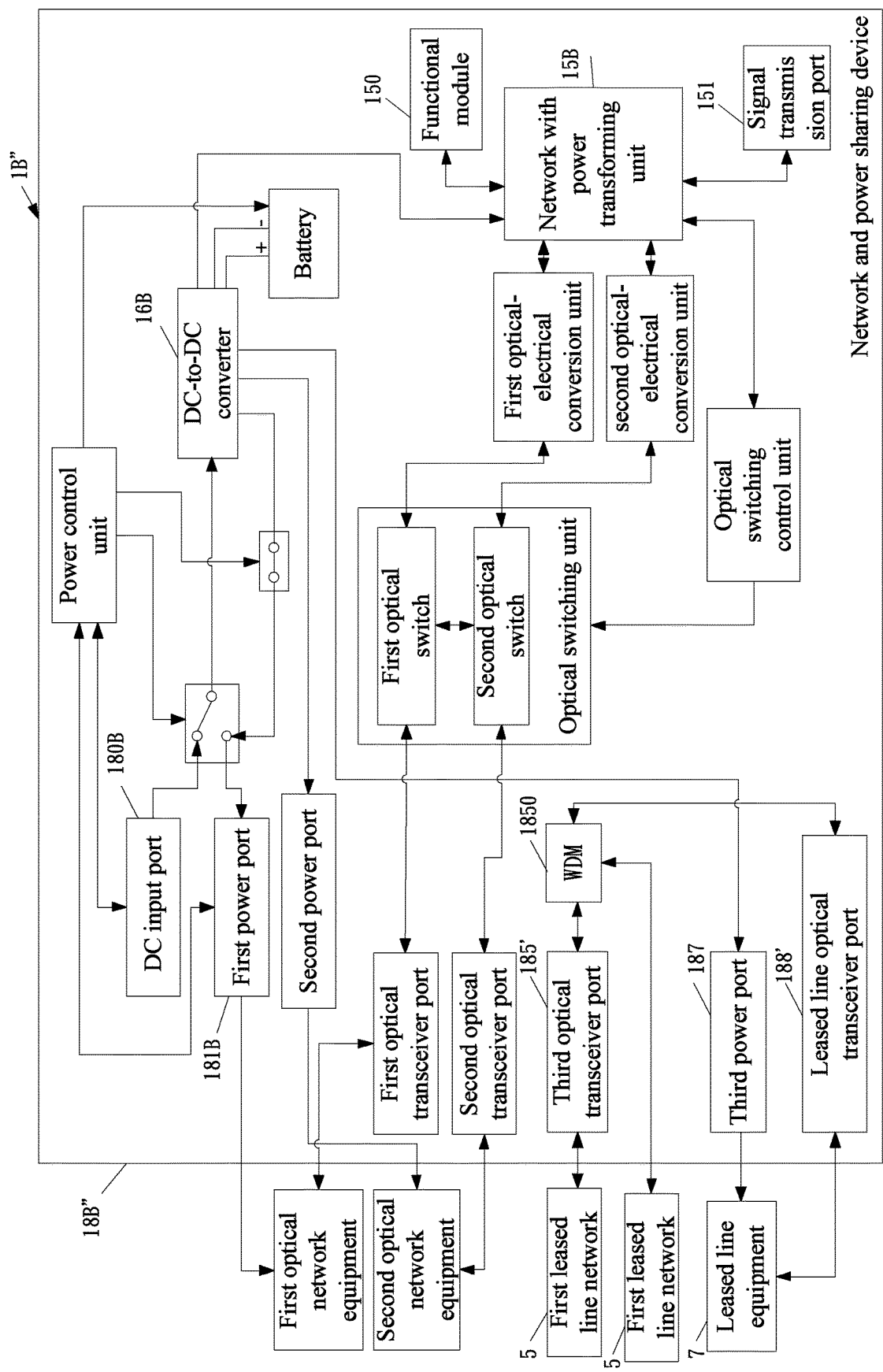
FIG. 6 is a block schematic diagram of basic system architecture of a network and power sharing device according to sixth embodiment of the present invention.

As shown in FIG. 6, to simplify description, a network and power sharing device 1B" in this embodiment is merely mentioned here for its difference from the network and power sharing device 1B of FIG. 5. The network and power sharing device 1B" in this embodiment further includes in its casing 18B": a wavelength division multiplexer (WDM) 1850 connected to a third optical transceiver port 185' and at least one leased line optical transceiver port 188', and is also connected to the first leased line network 5. The wavelength division multiplexer 1850 retrieves optical signals of a particular wavelength from the third optical transceiver port 185' and sends them to the at least one leased line optical transceiver port 188', or combines optical signals outputted from the leased line optical transceiver port 188' and optical signals transmitted by the first leased line network 5 to allow the combined optical signals to be transmitted by the first leased line network 5.

Figure 7:
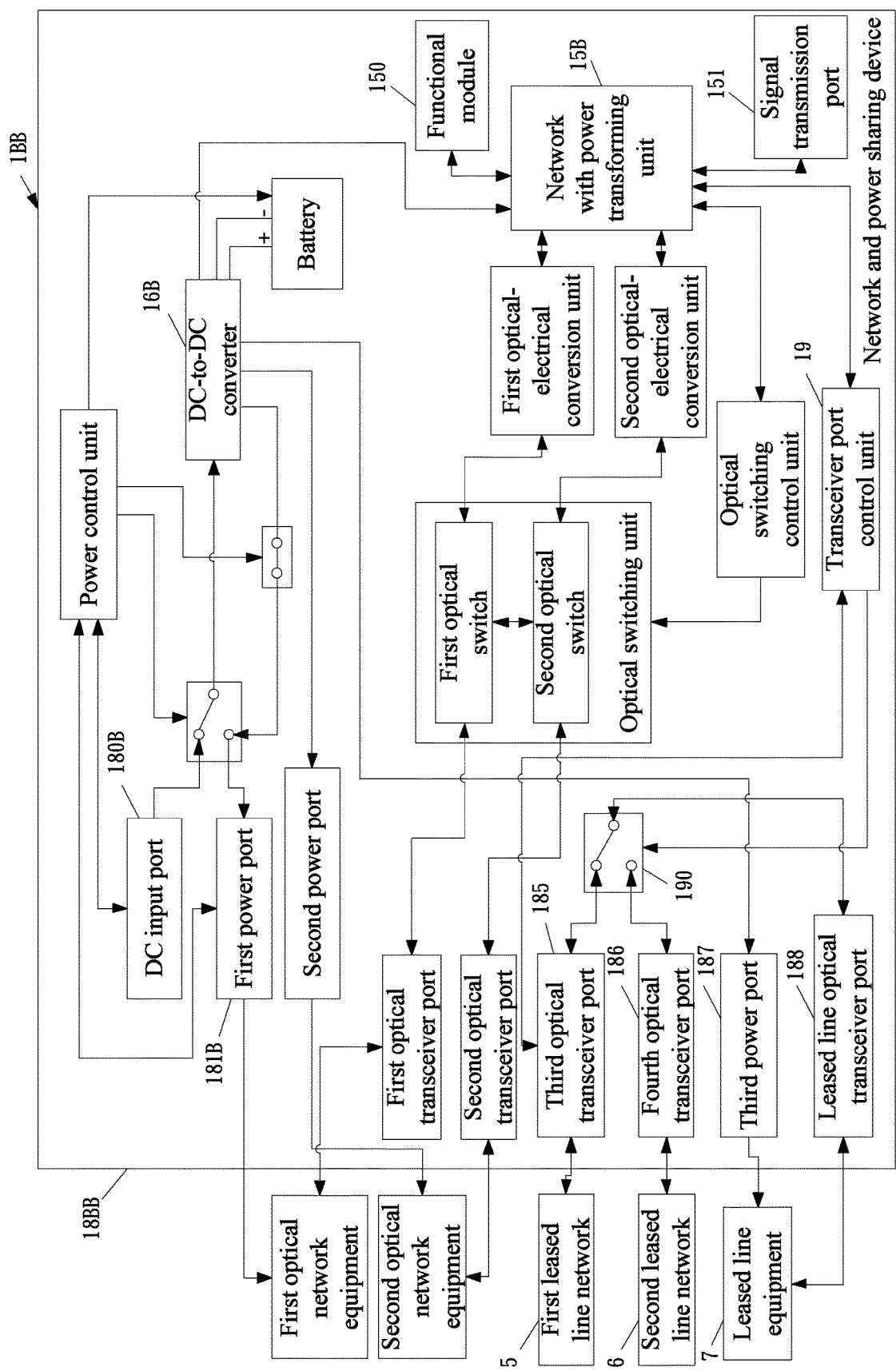
FIG. 7 is a block schematic diagram of basic system architecture of a network and power sharing device according to seventh embodiment of the present invention.

As shown in FIG. 7, to simplify description, a network and power sharing device 1BB in this embodiment is merely mentioned here for its differences from the network and power sharing device 1B of FIG. 5. The differences are that, the network and power sharing device 1BB further includes: a fourth optical transceiver port 186 mounted on a casing 18BB thereof, a leased line network switch 190 received in the casing 18BB, and a transceiver port control unit 19. The fourth optical transceiver port 186 is connected to the leased line network switch 190. The third optical transceiver port 185 in this embodiment is connected to the leased line optical transceiver port 188 via the leased line network switch 190. The fourth optical transceiver port 186 is also connected to a second leased line network 6. The transceiver port control unit 19 is used to monitor optical power of the third optical transceiver port 185. When the transceiver port control unit 19 finds the optical power too low, it sends a switching command to the leased line network switch 190 to connect the fourth optical transceiver port 186 to the leased line optical transceiver port 188. This allows the second leased line network 6, which is connected to the fourth optical transceiver port 186, to perform transmission operations when transmission through the first leased line network 5 connected to the third optical transceiver port 185 does not proceed normally.

Figure 8:
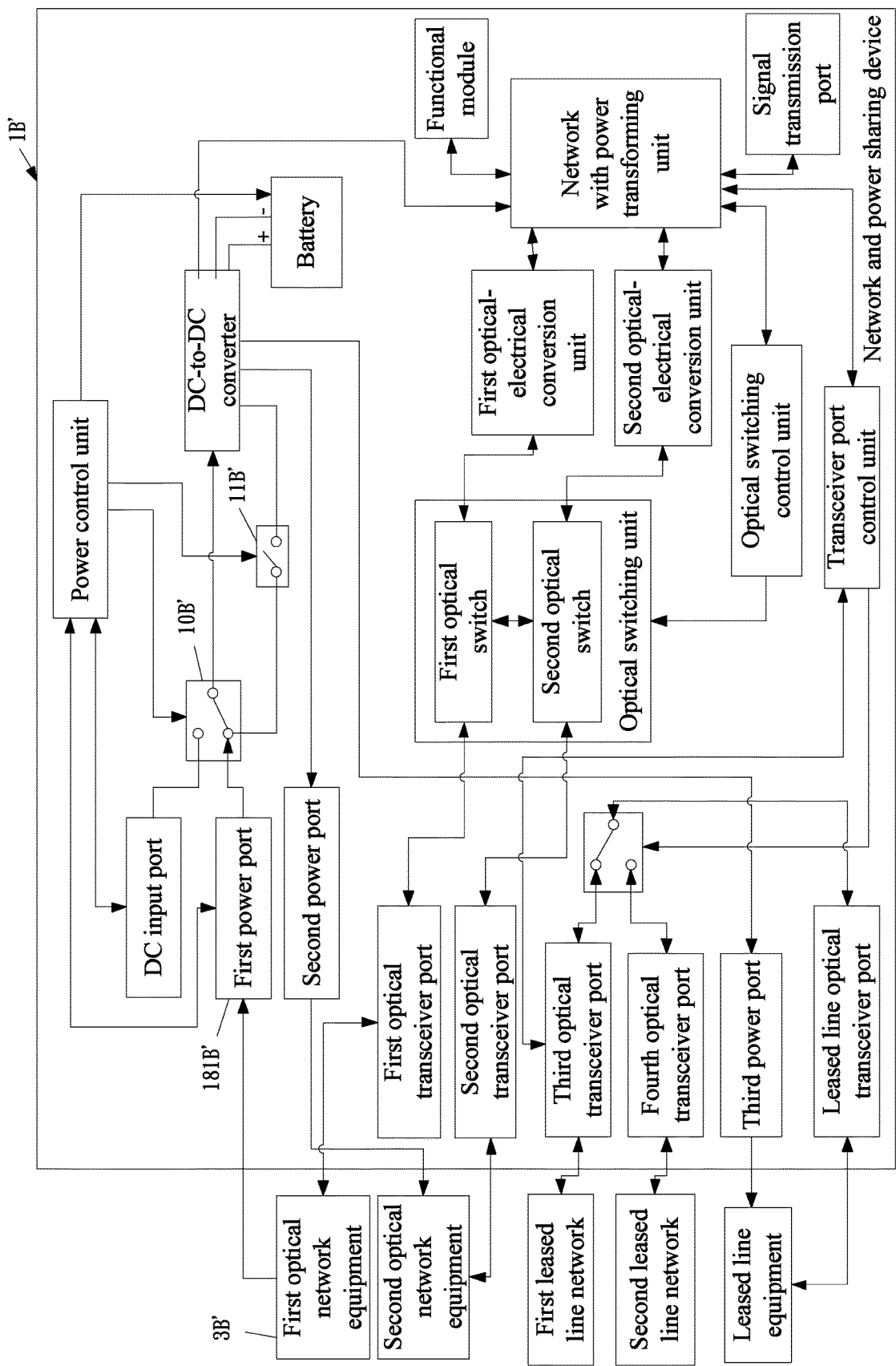
FIG. 8 is a block schematic diagram of basic system architecture of a network and power sharing device according to eighth embodiment of the present invention.

As shown in FIG. 8, to simplify description, a network and power sharing device 1B' in this embodiment is merely mentioned here for its difference from the network and power sharing device 1B of FIG. 5. The difference resides in power supply paths, wherein FIG. 5 shows power signals outputted by a DC input port 180B are used as a power supply, while in FIG. 8, equipment power received by a first power port 181B' from first optical network equipment 3B' serves as a power supply, which is similar to that described for FIG. 4 and thus not to be further detailed here.

Figure 9:
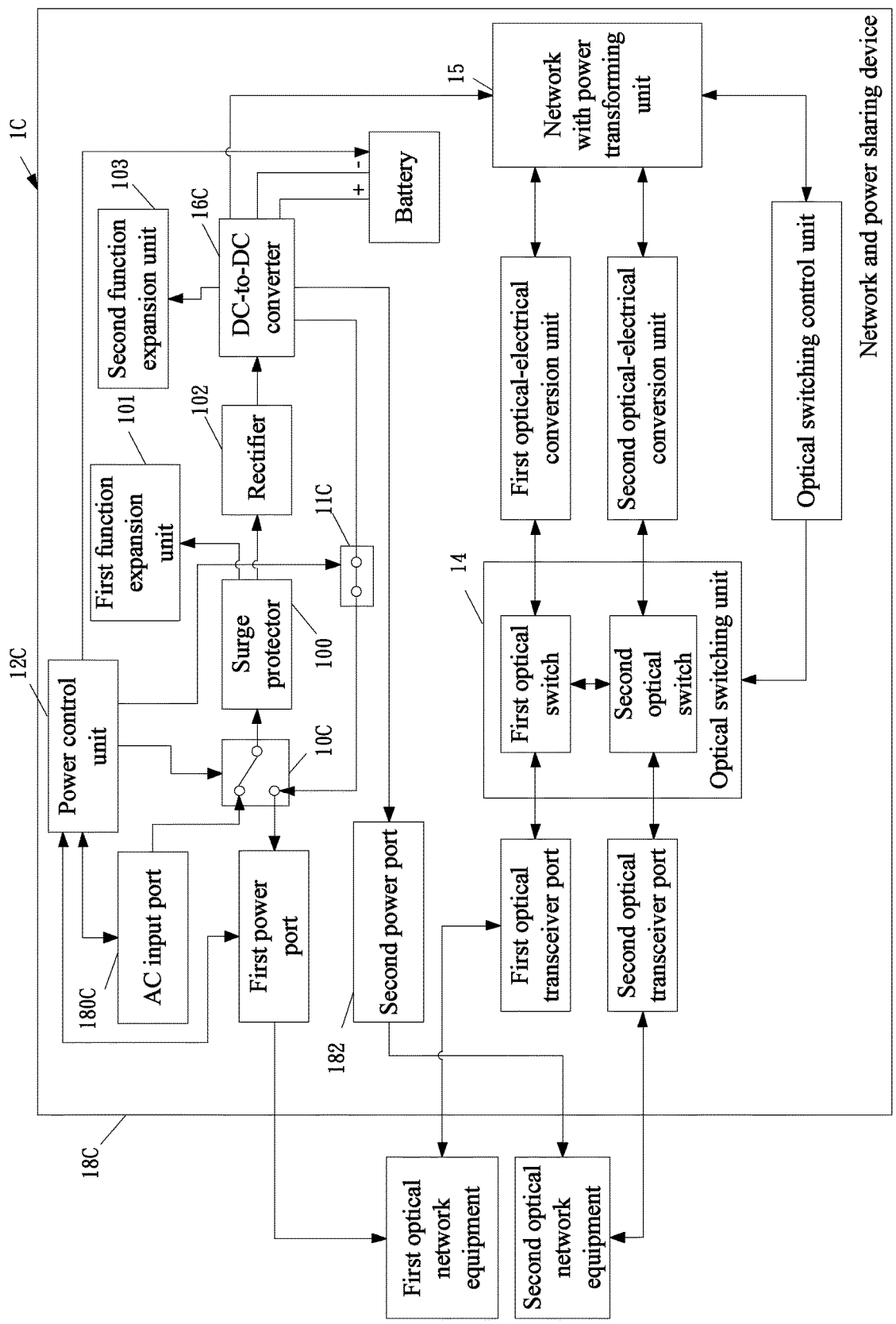
FIG. 9 is a block schematic diagram of basic system architecture of a network and power sharing device according to ninth embodiment of the present invention.

As shown in FIG. 9, to simplify description, a network and power sharing device 1C in this embodiment is merely mentioned here for its difference from the network and power sharing device 1A of FIG. 3. The difference resides in the network and power sharing device 1C using AC signals inputted to its power input port as a power supply. Referring to FIG. 9, an AC input port 180C is provided on a casing 18C of the network and power sharing device 1C, and is used to receive input of AC signals. In response to the input of AC signals, the network and power sharing device 1C further includes: a surge protector 100 and a rectifier 102, which are both received in the casing 18C. The surge protector 100 is connected to a power switch unit 10C to receive the AC signals, and for removing an instantaneous current occurring at the moment of AC signals being inputted and for outputting first AC power signals. The rectifier 102 is connected to the surge protector 100, and for rectifying the first AC power signals to DC power signals and outputting the DC power signals to a DC-to-DC converter 16C where the DC-to-DC converter 16C modulates the DC power signals into a DC power supply that is outputted to a turned-on equipment power switch 11C, the second power port 182 and the network with power transforming unit 15.

According to specification requirements, in a transmission path for the surge protector 100 outputting the first AC power signals to the rectifier 102, there can be mounted an AC leakage circuit breaker for providing indirect contact protection for human, for eliminating any risk of fire caused by a ground fault current generated due to insulation damage of AC transmission circuits, and also for distributing electricity and protecting circuits and power equipment from over loading and short circuiting.

The network and power sharing device 1C of the embodiment shown in FIG. 9 can be mounted in a base or on a pole of a street light, and obtains a power supply from electricity provided for the street light by a power company. The above AC power supply is thus from an outdoor street light. To adapt to an outdoor environment, the network and power sharing device according to the present invention includes a plurality of water-proof connection ports on its casing. Moreover, the network and power sharing device 1C in this embodiment further includes: a first function expansion unit 101 and a second function expansion unit 103, which are received in the casing 18C. The first function expansion unit 101 is used for being coupled to a peripheral device. The surge protector 100 further outputs second AC power signals to the first function expansion unit 101, making the peripheral device obtain power to work. The peripheral device can be street lighting equipment or road traffic directing equipment (such as traffic light), etc. If the first function expansion unit 101 is coupled to the street lighting equipment, it includes: a street light connector, a street light dimmer and a street light driver. The street light connector is mounted on the casing 18C and is connected to the street lighting equipment. The street light dimmer is connected to the street light connector to control lightness of the street lighting equipment. The street light driver is connected to the surge protector 100 and for receiving the second AC power signals to provide power for the street lighting equipment, such that the street lighting equipment obtains power to operate.

Similarly to the above description, according to specification requirements, in a transmission path for the surge protector 100 outputting the second AC power signals to the first function expansion unit 101, there can be mounted an AC leakage circuit breaker for providing indirect contact protection for human, for eliminating any risk of fire caused by a ground fault current generated due to insulation damage of AC transmission circuits, and also for distributing electricity and protecting circuits and power equipment from over loading and short circuiting.

The second function expansion unit 103 is for example a Global Navigation Satellite System (GNSS) unit that calculates time according to satellite signals to be used as reference for network timing.

Figure 10:
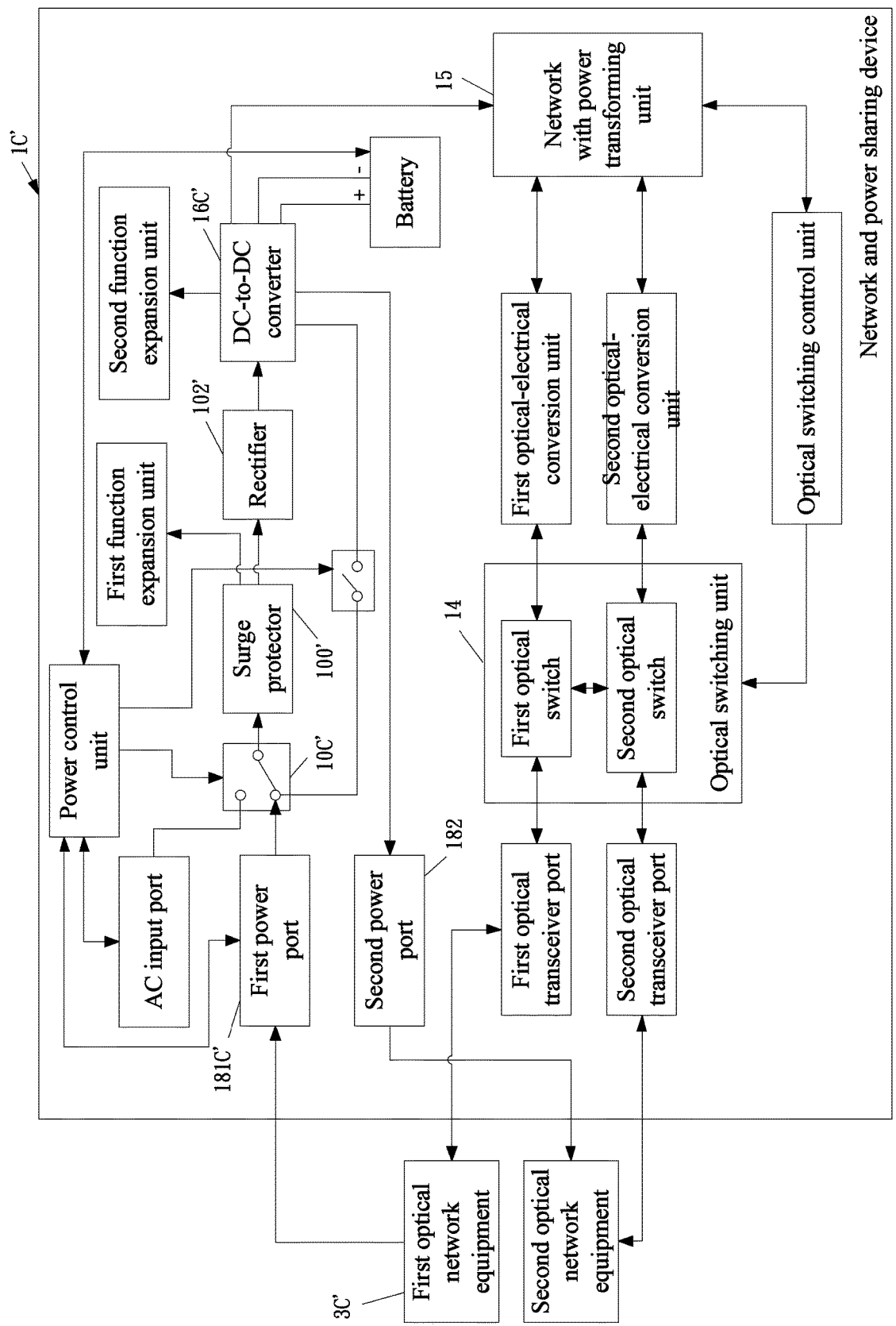
FIG. 10 is a block schematic diagram of basic system architecture of a network and power sharing device according to tenth embodiment of the present invention.

As shown in FIG. 10, to simplify description, a network and power sharing device 1C' in this embodiment is merely mentioned here for its differences from the network and power sharing device 1C of FIG. 9. The differences are that, the embodiment of FIG. 9 uses AC signals outputted from the AC input port 180C as a power supply, while in FIG. 10, a first power port 181C' outputs equipment power provided by first optical network equipment 3C' to serve as a power supply, wherein the equipment power includes AC signals. The embodiment of FIG. 10 has the same power supply path as that of FIG. 4 except the AC power supply used in this embodiment. Thus, AC signals outputted by a power switch unit 10C' in FIG. 10 undergo the same treatment as that described for FIG. 9, that is, a surge protector 100' treats the AC signals by removing an instantaneous current occurring at the moment of AC signals being inputted and outputs first AC power signals. Then, a rectifier 102' rectifies the first AC power signals to DC power signals and outputs the DC power signals to a DC-to-DC converter 16C' where the DC-to-DC converter 16C' modulates the DC power signals to a DC power supply that is outputted to the second power port 182 and the network with power transforming unit 15.

The network and power sharing device in each of the above embodiments further includes: a patch panel mounted between those optical transceiver ports and those optical switches (or leased line network switches), for allowing an installation person to easily adjust connections between the optical transceiver ports and the switches.

Figure 11:
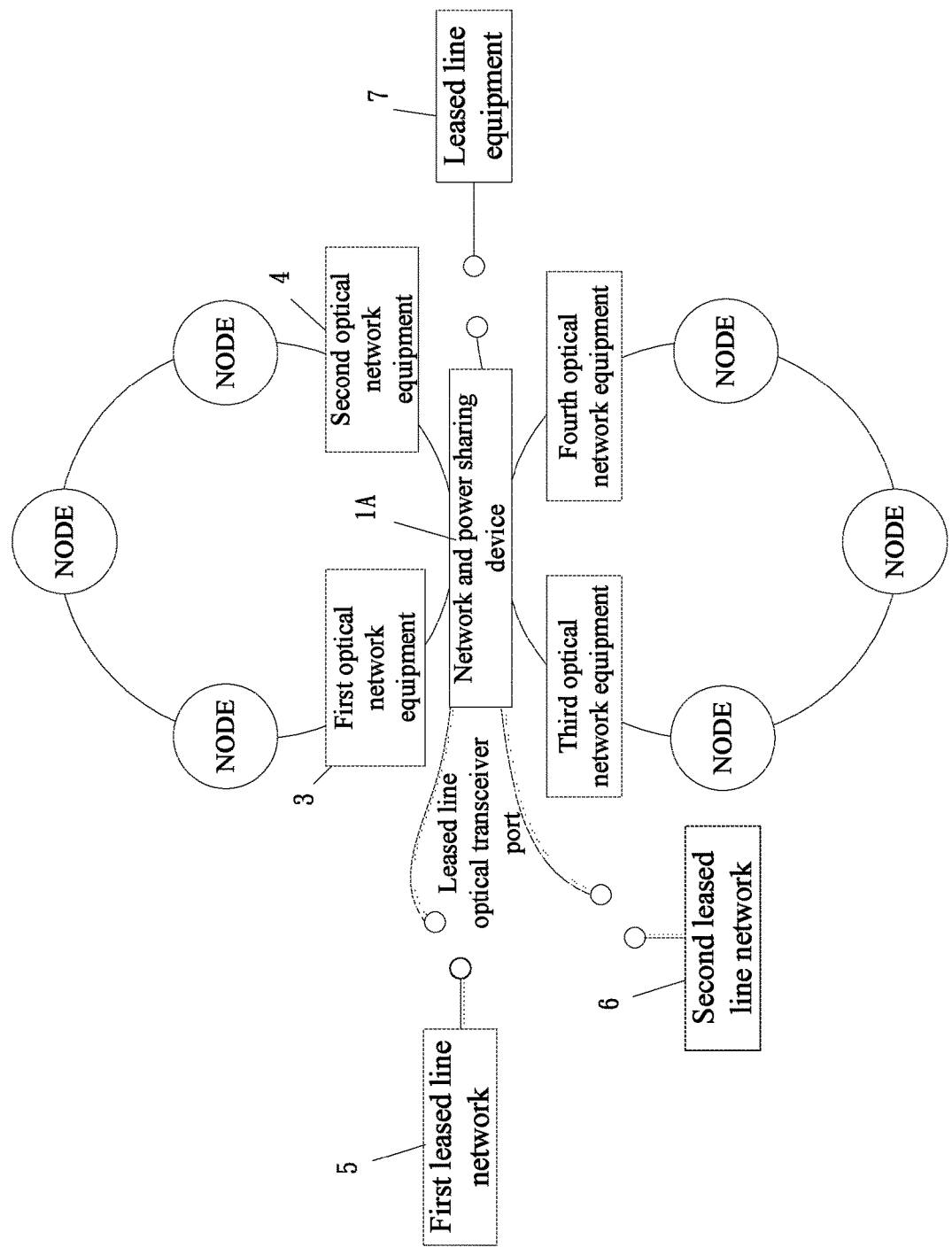
FIG. 11 is an application example of a network and power sharing device according to the present invention.

Referring to FIG. 11, the network and power sharing device according to the present invention is not limited to connection with two optical network equipment as described in the above embodiments, but can be formed with more optical transceiver ports and more optical switches and optical-electrical conversion units correspondingly in use with the optical transceiver ports according to specification requirements. As shown in FIG. 11, the network and power sharing device with this application architecture includes at least six optical transceiver ports for being connected to four optical network equipment and the first leased line network and the second leased line network, and uses the leased line optical transceiver port to be connected to the leased line equipment. Its power supply can be an external AC input (for example, from a street light), an external battery, or a DC input from any of the optical network equipment, such that there is no problem of power supply distribution restriction that is however encountered in the conventional technology. Therefore, the network and power sharing device according to the present invention achieves convenient networking technology for telecommunications providers and simplifies power supply arrangements, as well as allows flexibility for an installation person to choose, according to network transmission requirements, only required functional modules with functions such as built-in artificial intelligent computing processing and so on, to thereby provide optimized transmission channels.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

What is claimed is:

1. A network and power sharing device for being connected to first optical network equipment and second optical network equipment that are built in an optical network, so as to establish power supply architecture for the optical network and allow network communication operations between the first optical network equipment and the second optical network equipment operate normally, the network and power sharing device including:
    a casing formed with a first optical transceiver port, a second optical transceiver port, a power input port, a first power port and a second power port thereon, wherein the power input port is for receiving input of power signals and outputting the power signals, the first optical transceiver port is connected to the first optical network equipment and for receiving and transmitting optical signals, the second optical transceiver port is connected to the second optical network equipment and for receiving and transmitting optical signals, the first power port is connected to the first optical network equipment, and the second power port is connected to the second optical network equipment;
    a first optical-electrical conversion unit received in the casing, for converting the optical signals received by the first optical transceiver port into electric signals that are to be outputted, or converting electric signals into optical signals that are outputted to the first optical transceiver port;
    a second optical-electrical conversion unit received in the casing, for converting the optical signals received by the second optical transceiver port into electric signals that are to be outputted, or converting electric signals into optical signals that are outputted to the second optical transceiver port;
    a network with power transforming unit received in the casing, and connected to the first optical-electrical conversion unit and the second optical-electrical conversion unit to provide a signal and power transmission bridge between the first optical-electrical conversion unit and the second optical-electrical conversion unit; and
    a DC-to-DC converter received in the casing, for converting the power signals outputted by the power input port into a DC power supply that is outputted to the first power port, the second power port and the network with power transforming unit, so as to allow the first optical network equipment, the second optical network equipment and the network with power transforming unit to obtain power to operate.

2. The network and power sharing device according to claim 1, wherein there is a boost converter mounted between the DC-to-DC converter and the second power port.

3. The network and power sharing device according to claim 1, wherein the power signals received by the power input port are DC signals, and there is a boost converter mounted between the power input port and the DC-to-DC converter.

4. A network and power sharing device for being connected to first optical network equipment and second optical network equipment that are built in an optical network, so as to establish power supply architecture for the optical network and allow network communication operations between the first optical network equipment and the second optical network equipment operate normally, the network and power sharing device including:
    a casing formed with a first optical transceiver port, a second optical transceiver port, a first power port and a second power port thereon, wherein the first power port is connected to the first optical network equipment and for receiving power signals inputted by the first optical network equipment and outputting the power signals, the second power port is connected to the second optical network equipment, the first optical transceiver port is connected to the first optical network equipment and for receiving and transmitting optical signals, and the second optical transceiver port is connected to the second optical network equipment and for receiving and transmitting optical signals;
    a first optical-electrical conversion unit received in the casing, for converting the optical signals received by the first optical transceiver port into electric signals that are to be outputted, or converting electric signals into optical signals that are outputted to the first optical transceiver port;
    a second optical-electrical conversion unit received in the casing, for converting the optical signals received by the second optical transceiver port into electric signals that are to be outputted, or converting electric signals into optical signals that are outputted to the second optical transceiver port;
    a network with power transforming unit received in the casing, and connected to the first optical-electrical conversion unit and the second optical-electrical conversion unit to provide a signal and power transmission bridge between the first optical-electrical conversion unit and the second optical-electrical conversion unit; and
    a DC-to-DC converter received in the casing, for converting the power signals outputted by the first power port into a DC power supply that is outputted to the second power port and the network with power transforming unit, so as to allow the second optical network equipment and the network with power transforming unit to obtain power to operate.

5. The network and power sharing device according to claim 4, wherein there is a buck converter mounted between the DC-to-DC converter and the first power port, and there is a boost converter mounted between the DC-to-DC converter and the second power port.

6. A network and power sharing device for being connected to first optical network equipment and second optical network equipment that are built in an optical network, so as to establish power supply architecture for the optical network and allow network communication operations between the first optical network equipment and the second optical network equipment operate normally, the network and power sharing device including:
- a casing formed with a first optical transceiver port, a second optical transceiver port, a power input port, a first power port and a second power port thereon, wherein the power input port is for receiving input of power signals, the first optical transceiver port is connected to the first optical network equipment and for receiving and transmitting optical signals, the second optical transceiver port is connected to the second optical network equipment and for receiving and transmitting optical signals, the first power port is connected to the first optical network equipment, and the second power port is connected to the second optical network equipment;
- a power switch unit received in the casing, and connected to the power input port and the first power port, for switching power supply transmission paths of the power input port and first power port;
- an equipment power switch received in the casing and connected to the power switch unit;
- a power control unit received in the casing, for detecting if the power input port and the first power port output power signals and for controlling the power switch unit to switch the power supply transmission paths of the power input port and first power port, wherein when the power control unit detects the power input port outputting the power signals, it controls the power switch unit to output the power signals as a power supply and turns on the equipment power switch, and wherein when the power control unit detects the power input port not outputting the power signals while detects the first power port receiving equipment power outputted by the first optical network equipment, it controls the power switch unit to output the equipment power as the power supply and turns off the equipment power switch;
- a first optical-electrical conversion unit received in the casing, for converting the optical signals received by the first optical transceiver port into electric signals that are to be outputted, or converting electric signals into optical signals that are outputted to the first optical transceiver port;
- a second optical-electrical conversion unit received in the casing, for converting the optical signals received by the second optical transceiver port into electric signals that are to be outputted, or converting electric signals into optical signals that are outputted to the second optical transceiver port;
- a network with power transforming unit received in the casing, and connected to the first optical-electrical conversion unit and the second optical-electrical conversion unit to provide a signal and power transmission bridge between the first optical-electrical conversion unit and the second optical-electrical conversion unit; and
- a DC-to-DC converter received in the casing, for converting the power supply outputted by the power switch unit into a DC power supply that is outputted to the turned-on equipment power switch, the second power port and the network with power transforming unit.

7. The network and power sharing device according to claim 6, further including:
- an optical switch unit received in the casing, and having a first optical switch and a second optical switch, wherein the first optical switch is connected to the first optical transceiver port and the first optical-electrical conversion unit respectively, and the second optical switch is connected to the second optical transceiver port and the second optical-electrical conversion unit respectively; and
- an optical switching control unit for monitoring an operating status of the network with power transforming unit, wherein when the optical switching control unit finds the network with power transforming unit operating normally, it sends a first control command to the optical switch unit so as to allow the first optical transceiver port to be connected to the first optical-electrical conversion unit and allow the second optical transceiver port to be connected to the second optical-electrical conversion unit, and wherein when the optical switching control unit finds the network with power transforming unit not operating normally, it sends a second control command to the optical switch unit so as to allow the first optical transceiver port to be connected to the second optical transceiver port and implement optical signal transmission between the first optical transceiver port and the second optical transceiver port.

8. The network and power sharing device according to claim 7, further including: a patch panel for adjusting connections between the optical transceiver ports and the optical switches.

9. The network and power sharing device according to claim 6, further including: a functional module received in the casing and connected to the network with power transforming unit, for proving a service function.

10. The network and power sharing device according to claim 6, further including: a signal transmission port mounted on the casing and connected to the network with power transforming unit, wherein the signal transmission port is further connected to an external functional unit, for allowing the external functional unit to obtain power and perform signal transmission through the network with power transforming unit.

11. The network and power sharing device according to claim 10, wherein the signal transmission port further includes a network signal conversion module for performing network signal conversion on signals transmitted by the functional module, so as to implement network transmission through the network with power transforming unit.

12. The network and power sharing device according to claim 6, wherein the casing is further formed with a third optical transceiver port, a third power port and at least one leased line optical transceiver port thereon, wherein the third optical transceiver port is connected to a first leased line network and the leased line optical transceiver port, the leased line optical transceiver port is for being connected to first leased line equipment, and the third power port is connected to the DC-to-DC converter and for transmitting the DC power supply, which is outputted after converted by the DC-to-DC converter, to the first leased line equipment.

13. The network and power sharing device according to claim 12, wherein the casing is further formed with a fourth optical transceiver port thereon, and the network and power sharing device further includes a leased line network switch and a transceiver port control unit, wherein the fourth optical transceiver port is connected to a second leased line network and the leased line network switch, and the transceiver port control unit is for monitoring optical power of the third optical transceiver port, wherein when the transceiver port control unit finds the optical power too low, it sends a switching command to the leased line network switch to connect the fourth optical transceiver port to the leased line optical transceiver port, so as to allow the second leased line network, which is connected to the fourth optical transceiver port, to perform transmission operations when transmission through the first leased line network connected to the third optical transceiver port is abnormal.

14. The network and power sharing device according to claim 12, wherein the network and power sharing device further includes a wavelength division multiplexer received in the casing, wherein the wavelength division multiplexer is connected to the third optical transceiver port, the leased line optical transceiver port and the first leased line network, and for retrieving optical signals of a particular wavelength from the third optical transceiver port and transmitting them to the leased line optical transceiver port, or combining optical signals outputted by the leased line optical transceiver port and optical signals transmitted by the first leased line network to allow the combined optical signals to be transmitted by the first leased line network.

15. The network and power sharing device according to claim 6, wherein the power signals received by the power input port are AC signals, and the network and power sharing device further includes:
   a surge protector received in the casing, and connected to the power switch unit to receive the AC signals, so as to remove an instantaneous current occurring when the AC signals are inputted and output first AC power signals; and
   a rectifier received in the casing and connected to the surge protector to receive the first AC power signals, so as to rectify the first AC power signals to DC power signals and output the DC power signals to the DC-to-DC converter where the DC-to-DC converter modulates the DC power signals into the DC power supply that is outputted to the turned-on equipment power switch, the second power port and the network with power transforming unit.

16. The network and power sharing device according to claim 15, further including: a first function expansion unit for being coupled to a first peripheral device, wherein the surge protector further outputs second AC power signals to the first function expansion unit, making the coupled first peripheral device obtain power to work.

17. The network and power sharing device according to claim 16, wherein the first peripheral device is street lighting equipment, and the first function expansion unit includes:
   a street light connector mounted on the casing and for being connected to the street lighting equipment, so as to transmit the second AC power signals outputted by the surge protector to the street lighting equipment;
   a street light dimmer connected to the street light connector, for controlling lightness of the street lighting equipment; and
   a street light driver connected to the surge protector, for receiving the second AC power signals to provide power for the street lighting equipment, such that the street lighting equipment obtains power to operate.

18. The network and power sharing device according to claim 6, wherein the power signals received by the first power port from the first optical network equipment are AC signals, and the network and power sharing device further includes:
   a surge protector received in the casing, and connected to the power switch unit to receive the AC signals, so as to remove an instantaneous current occurring when the AC signals are inputted and output first AC power signals; and
   a rectifier received in the casing and connected to the surge protector to receive the first AC power signals, so as to rectify the first AC power signals to DC power signals and output the DC power signals to the DC-to-DC converter where the DC-to-DC converter modulates the DC power signals into the DC power supply that is outputted to the second power port and the network with power transforming unit.

19. The network and power sharing device according to claim 6, wherein there is a buck converter mounted between the DC-to-DC converter and the power switch unit, and there is a boost converter mounted respectively between the DC-to-DC converter and the equipment power switch and between the DC-to-DC converter and the second power port.

20. The network and power sharing device according to claim 6, further including: a first function expansion unit for being coupled to a first peripheral device, wherein the first function expansion unit is connected to the DC-to-DC converter to transmit the DC power supply outputted by the DC-to-DC converter to the first function expansion unit, making the coupled first peripheral device obtain power to work.

* * * * *